(12) United States Patent
Gopal et al.

(10) Patent No.: US 10,496,703 B2
(45) Date of Patent: Dec. 3, 2019

(54) TECHNIQUES FOR RANDOM OPERATIONS ON COMPRESSED DATA

(71) Applicant: INTEL CORPORATION, Santa Clara, CA (US)

(72) Inventors: Vinodh Gopal, Westborough, MA (US); James D. Guilford, Northborough, MA (US)

(73) Assignee: INTEL CORPORATION, Santa Clara, CA (US)

( * ) Notice: Subject to any disclaimer, the term of this patent is extended or adjusted under 35 U.S.C. 154(b) by 118 days.

(21) Appl. No.: 15/634,444

(22) Filed: Jun. 27, 2017

(65) Prior Publication Data

US 2018/0373808 A1     Dec. 27, 2018

(51) Int. Cl.
G06F 17/30    (2006.01)
G06F 16/901   (2019.01)
G06F 16/22    (2019.01)

(52) U.S. Cl.
CPC .......... *G06F 16/901* (2019.01); *G06F 16/221* (2019.01)

(58) Field of Classification Search
CPC ............................. G06F 16/901; G06F 16/221
See application file for complete search history.

(56) References Cited

U.S. PATENT DOCUMENTS

| | | | | |
|---|---|---|---|---|
| 2007/0109153 A1* | 5/2007 | Ma | ...................... | H03M 7/3086 341/50 |
| 2010/0281004 A1* | 11/2010 | Kapoor | ............. | G06F 16/24561 707/693 |
| 2015/0088926 A1* | 3/2015 | Chavan | ................. | G06F 16/221 707/769 |

OTHER PUBLICATIONS

Vinyals et al., "Show and tell: A neural image caption generator", CVPR, 2015, 9 pages.
Forrest, Conner, "Facebook is using AI to help blind people 'see' the photos in their newsfeed", <http://www.techrepublic.com/article/facebook-is-using-ai-to-help-blind-people-see-the-photos-in-their-newsfeed/>, Apr. 5, 2016, 10 pages.
Venugopalan et al., "Translating videos to natural language using deep recurrent neural networks", NAACL, 2015 11 pages.
Yao et al., "Describing videos by exploiting temporal structure", ICCV, 2015, 9 pages.
Venugopalan et al., "Sequence to sequence-video to text", ICCV, 2015, 9 pages.
Johnson et al., "DenseCap: Fully convolutional localization networks for dense captioning", CVPR, 2016, 10 pages.
Leskovec et al., "Cost-effective outbreak detection in networks", ACM SIGKDD, 2007, 31 pages.
Redmon et al., "You only look once: Unified, real-time object detection", CVPR, 2016, 10 pages.

* cited by examiner

*Primary Examiner* — Syed H Hasan

(57) ABSTRACT

Techniques and apparatus for discrete compression and decompression processes are described. In one embodiment, for example, an apparatus may include at least one memory and logic, at least a portion of the logic comprised in hardware coupled to the at least one memory, the logic to determine a compression configuration to compress source data, generate discrete compressed data comprising at least one high-level block comprising a header and at least one discrete block based on the compression configuration, and generate index information for accessing the at least one discrete block. Other embodiments are described and claimed.

25 Claims, 10 Drawing Sheets

TECHNIQUES FOR RANDOM OPERATIONS ON COMPRESSED DATA

TECHNICAL FIELD

Embodiments herein generally relate to information processing, and more particularly, to data compression techniques and techniques for accessing compressed data.

BACKGROUND

For "big data" applications, such as within a data center or cloud computing environment, large amounts of data need to be stored reliably and in a cost-effective manner. Compression processes are generally employed to reduce the size of data without sacrificing the information contained within the data. Data consumers are required to decompress the compressed files before using the data. Conventional compression formats for big data stores typically produce relatively poor compression ratios, for example, because they are fairly simplistic in an attempt to provide efficient software implementations, while also allowing for some degree of random access. Compression schemes such as Deflate offer better compression ratios, but current implementations do not allow for random access to compressed data. For example, column-oriented databases are often used in big data environments to provide the desired output. However, compressed column-oriented data requires decompression of a column of data from a start point to a point of interest to access the point of interest. Thus, random accesses on compressed big data stores using conventional techniques are generally cost and resource prohibitive.

DETAILED DESCRIPTION

Figure 1:
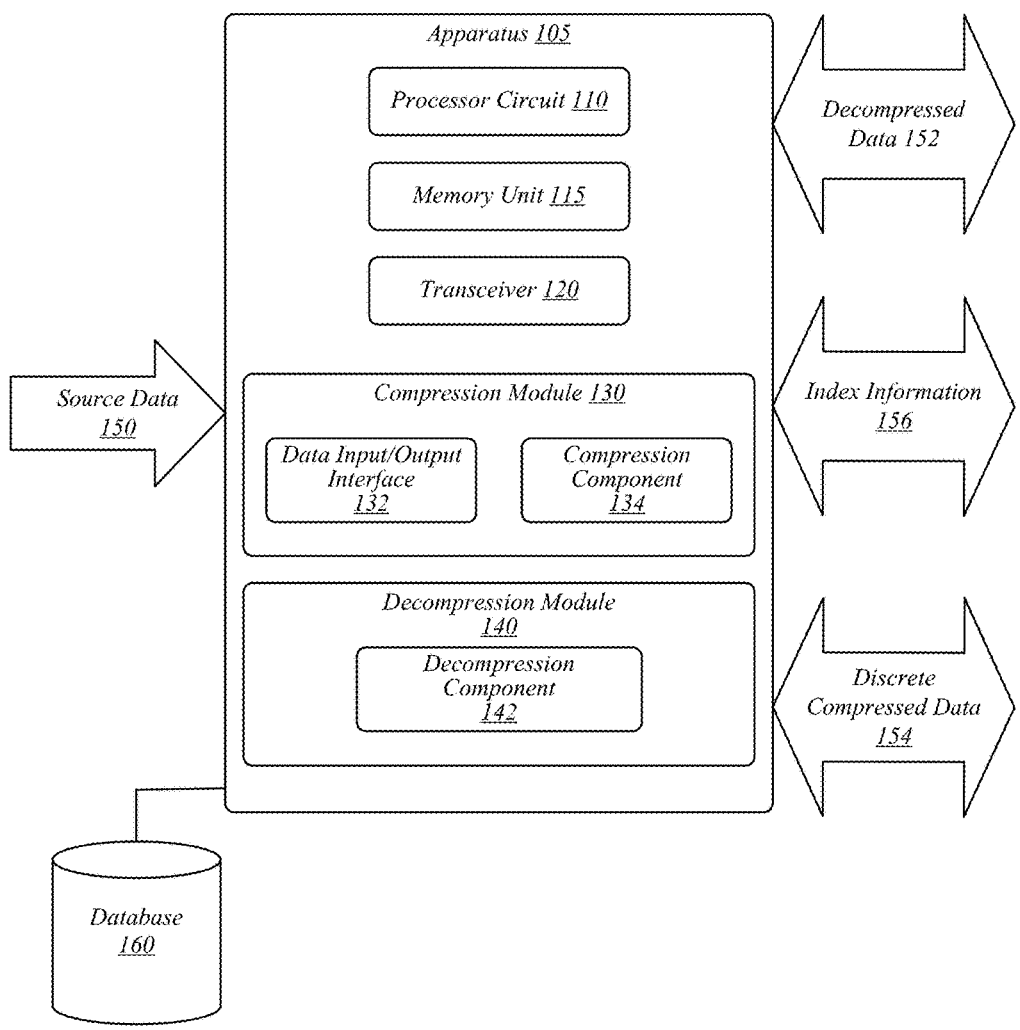
FIG. 1 illustrates an embodiment of a first operating environment.

Data compression techniques are needed that are capable of providing high compression ratios for compression schemes such as Deflate while also providing for at least a slightly limited random access to compressed data.

Various embodiments may be generally directed to techniques for data compression provided by a computer system. The computer system may include a compression module operative to perform a compression process to compress source data to generate compressed data. In some embodiments, the source data may include data from one or more "big data" sources. A non-limiting example of a big data source may include a column-oriented database, for instance, from a column-oriented database management system (DBMS). In some embodiments, the compression process may generate compressed data formed of discrete blocks (or "mini-blocks"). In various embodiments, each discrete block may only include information (for instance, "history" information) that references data within that discrete block. Accordingly, each discrete block may not include history information for other discrete blocks of the compressed data. In various embodiments, each discrete block may be decompressed without requiring decompression of other data elements, for instance, such as other discrete blocks. In various embodiments, the compression process may generate a block index that includes data for individually accessing the discrete blocks.

In some embodiments, the compressed data formed of discrete blocks may be configured to facilitate, among other things, random operations on the compressed data. In general, random operations may include any type of operation on specified data of interest ("operation target" or "decompression target"), or a portion of the compressed data that includes specified data of interest of the compressed data. In some embodiments, a random operation may include a random access to the compressed data. For example, the compressed data may include a compressed bit stream having discrete blocks $b_0$-$b_{100}$ and the operation target may be located within $b_{50}$. In a conventional system, a decompression process to locate and decompress data of interest would be required, among other things, to decompress the data from a starting data block (for instance, a first Deflate block) to the data block containing the operation target (for instance, a second Deflate block), or to decompress an entire Deflate block in order to access only a portion of the Deflate block. However, a discrete decompression process according to some embodiments may operate to locate and decompress only discrete block $b_{50}$ (which may one of a plurality of discrete blocks making up a Deflate block) in order to access the operation target. In this manner, compression processes according to some embodiments are able to provide compressed data having high compression ratios (for instance, at or about gzip level 9 ratios) while allowing for random operations on the compressed data.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example; the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

FIG. 1 illustrates an example of an operating environment 100 that may be representative of various embodiments. The operating environment 100 depicted in FIG. 1 may include an apparatus 105 having a processor circuit 110, a memory unit 115, and a transceiver 120. Processor circuit 110 may include and or may access logic having instructions for performing operations according to some embodiments. Processor circuit 110 may be communicatively coupled to memory unit 115 and/or transceiver 120. In some embodiments, processor circuit 110 may include a system-on-a-chip (SoC), a central processing unit, and/or the like.

As shown in FIG. 1, apparatus 105 may include a compression module 130. In various embodiments, compression module 130 may include or may be disposed within a processor circuit, such as processor circuit 110, a SoC, a field-programmable gate array (FPGA), and/or the like. In some embodiments, compression module 130 may include a processor circuit. In some embodiments, compression module 130 may be implemented in software, firmware, hardware, or a combination thereof. In various embodiments, compression module 130 may be implemented in hardware configured to execute software, firmware, and/or the like to perform operations according to some embodiments. In some embodiments, compression module 130 may be or may include a compression software application operative to compress data to generate compressed data according to some embodiments. In some embodiments, compression module 130 may be or may include a compression software application executed by processor circuit 110.

Compression module 130 may include a data input/output interface 132 configured to access source data 150, for example, to be compressed via compression module 130 to generate discrete compressed data 154. In various embodiments, discrete compressed data 154 may include compressed data formed of discrete blocks. In some embodiments, discrete compressed data 154 may include compressed data formed of high-level blocks. A non-limiting example of a high-level block may include A Deflate block (or A Deflate-based block). The high-level blocks of discrete compressed data may be formed of various block elements, including, without limitation, headers and discrete blocks.

In some embodiments, source data 150 may include uncompressed data. In various embodiments, source data 150 may include compressed data generated using conventional compression techniques (for instance, compressed data that does not include discrete mini blocks according to some embodiments). Accordingly, in some embodiments, compression module 130 (for instance, in combination with decompression module) may operate to transform conventional compressed data into discrete compressed data 154.

Data input/output interface 132 may receive source data 150 from various sources, including software applications or threads, hardware elements, data buffers, and/or the like. For instance, source data 150 may be obtained from database 160. In various embodiments, database 160 may include data from a big data platform, such as a data center, cloud computing environment, distributed computing environment, social networking platform, business analytics platform, and/or the like. In general, a big data platform may be defined by various characteristics of the data associated with the platform, such as the volume, velocity, variety, and/or value of the data. In some embodiments, database 160 may include a column-oriented (or columnar) database, for instance, of a DBMS. In general, a column-oriented database stores data by columns instead of by row. In a column-oriented database, each column may be stored separately, with attribute values of the same column stored contiguously. Although column-oriented databases are used in some examples, embodiments are not so limited as other types of databases may be used as database 160 or as data source 150 according to some embodiments. Non-limiting types of other databases may include relational databases, correlation databases, object databases, hierarchical databases, and/or the like. In addition, database 160 and data source 150 may include databases or data sources from various proprietary and/or open source platforms, such as Oracle®, Microsoft® SQL Server, IBM® Informix®, SAP® Sybase®, and/or the like. In various embodiments, source data 150 may be in the form of a data sequence or stream received by or otherwise accessed by compression module 130 via data input/output interface 132. A data buffer (not shown) may be used to store data, such as intermediate data, data waiting to be compressed, compressed data waiting to be transmitted, and/or the like. In some embodiments, data input/output interface 132 may access compressed data stored within data buffer for transmission to a consumer of the compressed data.

Compression module 130 may include compression component 134 operative to compress source data 150 to generate discrete compressed data 154. In some embodiments, compression component 134 may be implemented in hardware, software, firmware, or any combination thereof. In various embodiments, compression component 134 may include a compression engine, algorithm, process, software application, firmware application, processor, co-processor, FPGA, and/or the like. Compression component 134 may be configured to encode or compress data using a discrete compression process according to some embodiments. The discrete compression process may be based on one or more existing compression processes. Non-limiting examples of compression processes may include lossless data compression, Lempel-Ziv (LZ), LZ77, LZ4, LZFX, LZSS, Deflate, Snappy, Huffman encoding, compressed adaptive index (COMPAX), improved COMPAX (ICX), single-pass recompression (SPR), and/or the like.

In some embodiments, the discrete compression process performed by compression component 134 may include a variation of LZ77 compression and/or Deflate. For example, the discrete compression process may operate using a Deflate compression process except that, among other things, instead of generating compressed data formed of conventional Deflate blocks, the discrete compression process may generate discrete compressed data that includes discrete blocks according to some embodiments. In various embodiments, the discrete compressed data may include Deflate blocks formed of one or more discrete blocks. In general, and as described in more detail below, a Deflate compression process may keep track of history information in each Deflate block. Accordingly, at any point in the Deflate-compressed data, such as for a particular Deflate block, there is history information of the preceding characters for a certain window (which may include data in one or more other Deflate blocks), such as 32 KB. A 32 KB sliding window means that the compressor (and decompressor) have a record of what the last 32768 (32*1024) characters were. Accordingly, decompressing data of an operation target stored in a Deflate block, requires decompressing at least an entire Deflate block as well as any blocks referred to in the historical information of the Deflate block (which may also include historical information referring to still other Deflate blocks, and so on). However, in some embodiments, the discrete compression process may use a LZ77-based and/or Deflate-based compression process, but may generate compressed data formed of, among other things, discrete blocks according to some embodiments instead of conventional Deflate blocks. For instance, in some embodiments, the discrete blocks may not include historical information that references other discrete blocks (the historical information may point to other data within the same discrete block). In some embodiments, each discrete block may include all of the information necessary to decompress the discrete block and does not rely on other discrete blocks in order to be decompressed. Although LZ77 and Deflate are used as examples, embodiments are not so limited as any compression process capable of being used according to some embodiments is contemplated herein.

In general, the LZ77 compression process operates by replacing repeated occurrences of data with references to previous occurrences of that data existing earlier in the input (uncompressed) data stream. A match is encoded by a pair of numbers called a length-distance pair ("distance" may be referred to as an "offset"). As such, the LZ77 compression process finds repeated substrings and replaces them with backward references (relative distance offsets). The LZ77 compression process can use a reference to a duplicated string if the relative distance is less than the maximal history size defined in the algorithm encoding (for instance, 32 KB in Deflate). The compressed data consists of a series of elements of two types: literal bytes (copy of the data) and pointers to replicated strings, where a pointer is represented as the pair <length, backward distance>. The various algorithms in the LZ77 family all find LZ77 string matches during compression, but encode the literals or references differently (for instance, Huffman codes in Deflate, simple byte-oriented packing in Snappy, and/or the like), and have different maximal history windows. In general, a literal may include raw encoded data (as opposed to data encoded as a length, distance pair).

To spot matches, the LZ77 encoder keeps track of some amount of the most recent data, such as the last 2 kB, 4 kB, 32 kB, and/or the like. The structure in which this data is held is called a "sliding window" or "history window" (accordingly, LZ77 is sometimes referred to as sliding window compression). The encoder keeps the most recent data within the sliding window to look for matches (and the decoder likewise will keep this data to interpret the matches the encoder refers to). Accordingly, at any point in the data, such as for a particular Deflate block, there is a record ("history" or "history information") of the preceding characters (which may be in one or more other Deflate blocks). A 32 KB sliding window means that the compressor (and decompressor) have a record of what the last 32768 (32*1024) characters were.

During LZ77 compression, byte patterns of a preceding (earlier or older) portion of a byte stream may be compared against a current portion (or current bit sequence) of the byte stream. If a sequence of bytes is found in the current portion that matches a sequence of bytes in the preceding portion (or preceding byte sequence), the sequence of bytes in the current portion is replaced with a reference to the same sequence of bytes in the earlier portion.

The reference that is inserted for the current byte sequence identifies the length of the current byte sequence and the location of the preceding byte sequence expressed, for instance, as a "distance" from the current byte sequence to the matching preceding byte sequence. As such, the LZ77 compression process encodes a byte sequence as a "length, distance pair" that is inserted in the byte stream in place of a current byte sequence. Upon decoding the compressed stream, when the decoder reaches the length, distance pair that is embedded in the byte stream, the decoder uses the distance part of the length, distance pair to refer back to the start of the matching byte sequence and reproduces the correct byte sequence of the decoded stream by reproducing a number of bytes from the start of the matching byte sequence that is equal to the length component of the length, distance pair.

A non-limiting example of an LZ77 compression process may be performed on the following illustrative sequence, recited in a form prior to compression: "ABCD BBBB BC CDE DEFG BBBB EFGH." During compression, the LZ77 compression process may locate the match "BBBB," having a length of 6 (including spaces). The matching "BBBB" sequences have a match offset (for instance, an intervening distance) of 17. The compressed sentence may be in the following form: "ABCD BBBB BC CDE DEFG @(6,17) EFGH," with "(6,17)" being the length and distance pair associated with the BBBB match.

The Deflate compression process is used as the bases of various compression platforms, such as gzip/Zlib and Winzip/PKzip. In general, Deflate uses a series of blocks (Deflate blocks) corresponding to successive blocks of input data. Each block may be compressed using a combination of the LZ77 compression process and Huffman coding. As described above, the LZ77 compression process operates to find repeated substrings and replaces the repeated substrings with references, such as relative distance offsets. The LZ77 compression process may use a reference to a duplicated string occurring in the same block or previous blocks, for instance, up to 32 KB previous input bytes (a "history" or "history information"). The compressed data may include a series of elements of two types: literal bytes and pointers to replicated strings (represented as the pair: <length, backward distance>. The LZ77 compression process operates to find string matches at each position.

Using data structures to efficiently index locations where matching strings may be found, the LZ77 compression process may operate to search a number of locations to determine a "best" match. The effort (for instance, the number of searches attempted) is specified by the compression level. For instance, gzip/Zlib defines a number of compression levels, ranging from 1 to 9, with 9 being the highest compression level and requiring the highest processing cost. A file may be represented as a series of tokens, where each token may represent a literal byte or a match of text that occurred previously. The tokens may be encoded using a variable-size code (for instance, a Huffman code followed by certain "extra bits").

As shown in FIG. 1, apparatus 105 may include a decompression module 140. In various embodiments, decompression module 140 may include or may be disposed within a processor circuit, such as processor circuit 110, a system-on-a-chip (SoC), a field-programmable gate array (FPGA), and/or the like. In some embodiments, decompression module 140 may include a processor circuit. In some embodiments, decompression module 140 may be implemented in software, firmware, hardware, or a combination thereof. In various embodiments decompression module 140 may be implemented in hardware configured to execute software, firmware, and/or the like to perform operations according to some embodiments.

Decompression module 140 may include a decompression component 142 operable to decompress compressed data, such as discrete compressed data 154 to generate decompressed data 152. In some embodiments, compression component 134 may operate to generate index information 156 during the discrete compression process. In some embodiments, index information 156 may include information for decompression component 134 to access data within discrete compressed data 154, such as data at a particular high-level block (for instance, a Deflate block) and/or discrete block of discrete compressed data 154. For example, index information 156 may include an index array or other data structure that may record offset information for Deflate blocks and/or discrete blocks of discrete compressed data 154. In various embodiments, the offset information may include a starting byte offset for each discrete block, a bit offset for a first token of each discrete block, a bit offset of headers associated with the discrete blocks, and/or the like. In some embodiments, decompression component 142 may use index information 156 to decompress discrete compressed data 154 to generate decompressed data 152.

In various embodiments, discrete compressed data 154 may include a Deflate (or Deflate-based) compression stream such that discrete compressed data 154 may be decompressed using a Deflate-compliant compressor. In various embodiments, to perform a random operation on discrete compressed data 154, such as decompressing discrete compressed data 154, decompression component 142 may use index information 156 to determine which discrete block includes an operation target and where a corresponding header (for instance, Deflate header of a corresponding Deflate block) is located (see, for example, FIG. 3). The header would then be appended to the discrete block and the discrete block would be decompressed. Accordingly, to decompress a single element according to some embodiments, a discrete decompression process would only have to decompress, on average, half of a discrete block (compared with an entire column of data for compressed column-orientated data).

Figure 2:
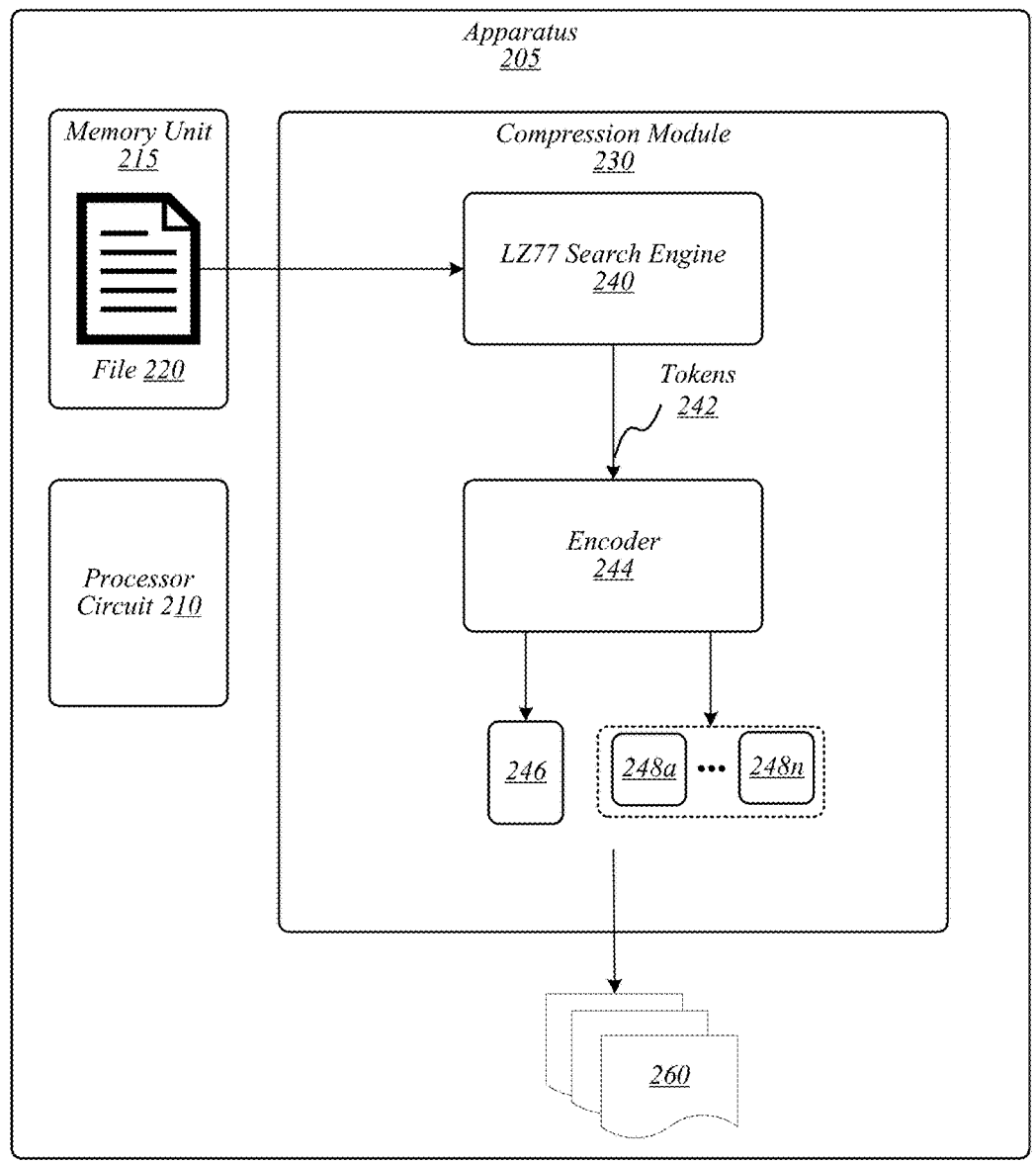
FIG. 2 illustrates an embodiment of a second operating environment.

FIG. 2 illustrates an example of an operating environment 200 that may be representative of various embodiments. The operating environment 200 depicted in FIG. 2 may include an apparatus 205 having a processor circuit 210 and a memory unit 215. A compression module 230 may be operative to generate discrete compressed data 260. In some embodiments, compression module 230 may be implemented in hardware and/or software executed via processor circuit. In various embodiments, compression module 230 may be configured to operate a LZ77-based and/or Deflate-based discrete compression process. In general, compression module may be configured to operate a discrete compression process according to some embodiments to compress data according to a Deflate-based compression process using discrete blocks in place of or in combination with conventional Deflate blocks.

As shown in FIG. 2, an LZ77 search engine 240 of compression module 230 may receive source data in the form of a file 220, for example, stored in memory unit 215. File 220 may include one or more individual files and/or one or more streams of data. Embodiments are not limited in this context. LZ77 search engine 240 may analyze file 220 for repeated patterns. Repeated patterns of a certain length (for instance, greater than or equal to 3 characters) may be reduced to a length-distance pair token. The tokens 242 may be provided to an encoder 244, such as a Huffman encoder. Encoder 244 may operate to encode tokens 242, for instance, by encoding most-frequently seen tokens 242 with a minimum size bit symbol.

In various embodiments, encoder 244 may generate blocks 248a-n and a corresponding index 246 (see, for example, FIG. 4) which may be stored, provided, and/or the like as discrete compressed data 260. In some embodiments, blocks 248a-n may include discrete blocks and/or Deflate blocks formed of discrete blocks. In various embodiments, encoder may generate blocks 248a-n that include Deflate blocks that include a certain number of discrete blocks. For example, encoder 244 may generate a new Deflate block every n discrete blocks, where n may include 1, 2, 3, 4, 5, 8, 12, 16, 24, 32, 64, 100, and any value or range between any two of these values. Accordingly, in some embodiments, each Deflate block includes a certain number of integral, undivided discrete blocks (for instance, a discrete block may not span multiple Deflate blocks).

A discrete block may be configured to include a certain amount of data, such as uncompressed data. In some embodiments, the amount of data may include 100 bytes, 200 bytes, 500 bytes, 1 KB, 2 KB, 5 KB, 10 KB, 20 KB, 32 KB, and any value or range between any two values (including endpoints). In some embodiments, discrete blocks may have different amounts of uncompressed data. In some embodiments, discrete blocks may each have the same (or substantially similar) amount or limit on the amount of data, such as uncompressed data. In various embodiments, each discrete block may include a fixed amount of about 1 KB of uncompressed data. In some embodiments, the amount of data (for instance, uncompressed data or the length of matches) may not be constrained from the Deflate standard and a new discrete block may be generated after a first token 242 that reaches the next discrete block boundary. In various embodiments, if the discrete block has a nominal size S, then the start of the $i^{th}$ discrete block may be between byte iS and (iS+257) (because the longest match in Deflate is 258 bytes). Accordingly, the average size of a discrete block may be S (although the size of any particular discrete block may vary by +/−257 bytes).

A discrete compression process according to some embodiments may generate various compression configurations based on one or more characteristics, such as discrete block size, number of discrete blocks in each Deflate block, and/or the like. For instance, a compression configuration may be expressed as <size of discrete blocks (or size of uncompressed data of discrete blocks)>/<number of discrete blocks per Deflate block> or <size of discrete blocks>/<size of high-level blocks>.

For example, a compression configuration including discrete blocks of size 1 KB with 4 discrete blocks per Deflate block may have a compression configuration of 1/4. In another example, a compression configuration may include 1/16 with a discrete block size of 1 KB and a high-level block size of 16 KB (for instance, 16 discrete blocks per high-level block). In a further example, a compression configuration may include 16/64 with a discrete block size of 16 KB and a high-level block size of 64 KB (for instance, 4 discrete blocks per high-level block). Non-limiting examples of compression configurations may include 1/2, 1/4, 1/8, 1/16, 1/32, 1/62, 1/128, 2/2, 2/4, 2/8, 2/16, 2/32, 2/62, 2/128, 4/2, 4/4, 4/8, 4/16, 4/32, 4/62, 4/128, 8/2, 8/4, 8/8, 8/16, 8/32, 8/62, 8/128, 16/2, 16/4, 16/8, 16/16, 16/32, 16/62, 16/128, 32/2, 32/4, 32/8, 32/16, 32/32, 32/62, 32/128, and any value or range between any two of these values (including endpoints) for either the size of the discrete blocks or the number of discrete blocks per deflate block. In some embodiments, a compression configuration may include 1/4. In some embodiments, a compression configuration may include 1/16. In some embodiments, a compression configuration may include 16/64.

In various embodiments, compression module 230 may use one or more default compression configurations to generate discrete compressed data. In some embodiments, compression module 230 may use an optimal compression configuration determined to provide one or more optimal compression characteristics (for instance, compression ratio, compression speed, and/or the like) for the data being compressed. In some embodiments, optimal compression configurations for a particular data source (for instance, a column-oriented database) may be stored, such as in memory unit 215 or as meta data in a database associated with a data source, and may be looked up by compression module 230 for use during a discrete compression process.

Figure 3:
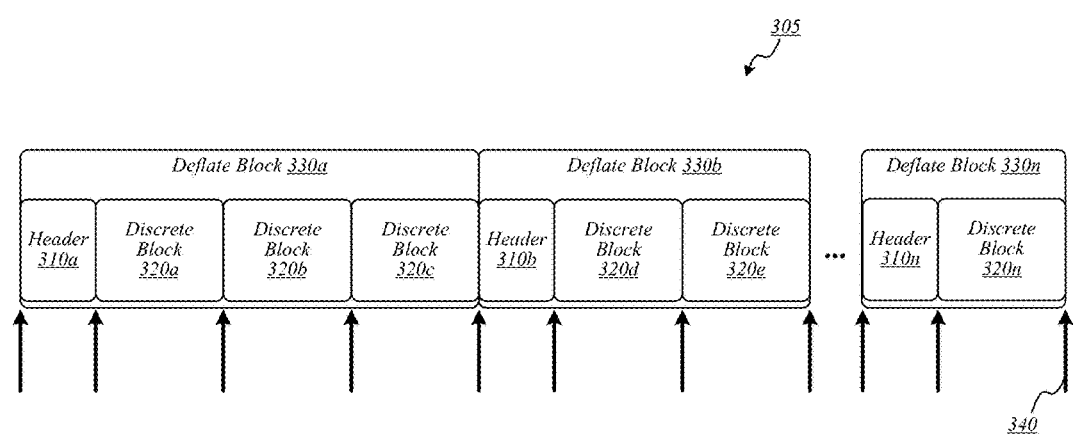
FIG. 3 illustrates a discrete compressed data stream embodiment according to some embodiments.

FIG. 3 depicts an illustrative discrete compressed data stream according to some embodiments. As shown in FIG. 3, a discrete compressed data stream 305 may include various elements, including headers 310a-n and discrete blocks 320a-n. In some embodiments, data stream 305 may include Deflate blocks 330a-n, which may be formed of headers 310a-n and/or discrete blocks 320a-n.

In various embodiments, a compression module (such as compression module 130 and/or 230) may generate index information 340 that may include element information associated with elements of discrete compressed data stream, such as Deflate blocks 330a-n, headers 310a-n, and discrete blocks 320a-n. Although index information 340 includes multiple arrow references in FIG. 3, only one is labeled to simplify the figure. In some embodiments, index information 340 may include an index array configured to include element information such as offsets. Non-limiting examples of offsets may include a starting byte offset of each discrete block 320a-n, bit offset of a first token, starting bit-offsets of headers 310a-n (for instance, Deflate block headers), and/or the like. In various embodiments, the arrow references of index information 340 depicted in FIG. 3 may represent entries into the index array.

In some embodiments, index information 340 may include a compressed bit offset as well as the byte offset. For example, because the discrete block 320a-n boundaries are not placed every X bytes, the index array may include the compressed bit offset as well as the byte offset (modulo X (or mod X)). In various embodiments, any match spanning an X-byte boundary may be prevented, such that the boundaries of discrete blocks 320a-n may be exactly every X bytes. In such embodiments, index array may use only bit offsets, as the byte offsets would be implied, determined indirectly, and/or the like.

Figure 4:
FIG. 4 illustrates index information according to some embodiments.

FIG. 4 depicts illustrative index information according to some embodiments. As shown in FIG. 4, index information 405 may include nominal byte information 422 and an index array 420 including a byte offset 424 (for instance, of discrete blocks and/or Deflate blocks of discrete compressed data corresponding with index information 405) and a bit offset 426 (for instance, of a bit stream of discrete compressed data corresponding with index information 405). In some embodiments, the byte offset 424 may represent the byte offset within the uncompressed data, and the bit offset 426 may represent the bit offset of the uncompressed data. In various embodiments, the bit offset 426 may have a value of 80 for entry 0 due to the presence of a header of the Deflate block (for example, a gzip header). Index information 405 may correspond to a compression configuration of 1/4. Accordingly, every fifth entry (for instance, entries 0, 5, 10, and so on) represent the start of a Deflate block header, and the intervening four entries (for instance, 1, 2, 3, 4, 6, 7, 8, 9, and so on) represent the start of the tokens for each discrete block. The nominal byte information 422 may represent what a byte column may contain if the discrete blocks started at their nominal value. However, in some embodiments, the match length may not be limited such that the actual byte offset for the start of a discrete block and/or header may be larger than the nominal byte offset, for example, by up to <maximum match length>−1. In various embodiments, index information 405 may not be required to contain the entire byte offset. For instance, in some embodiments, index information 405 may only include the byte offset modulo the discrete block size (byte offset modulo 1024 for the index information depicted in FIG. 4).

In an example in which an application (via a discrete decompression process) seeks to decompress discrete compressed data to find the value of byte number 3100, the discrete decompression process would determine that the nominal discrete block entry is 4 (3100 is between 3072 and 4095 of nominal byte information 422). However, checking the actual byte offset for entry 4, the discrete decompression process (for instance, operating via a decompression module) may determine that the nominal discrete block actually begins at byte offset 3242, which is beyond the desired byte 3100. Accordingly, the discrete decompression process may determine that byte 3100 is located in an earlier discrete block, namely, discrete block of entry 3 (the "target discrete block" that includes the operation target). The discrete decompression process may then determine that the Deflate header for the target discrete block of entry 3 is at entry 0. The following two portions of the compressed bit stream of the discrete compressed data may be decompressed: the header (bit offset 80 to 577) and the discrete block of entry 3 (bit offset 5831 to 8056). The discrete decompression process may therefore decompress 1192 bytes (bytes 2050 to 3042), and the desired byte 3100 would be in the decompressed data at an offset of 1050 (2050-3100).

Figure 5:
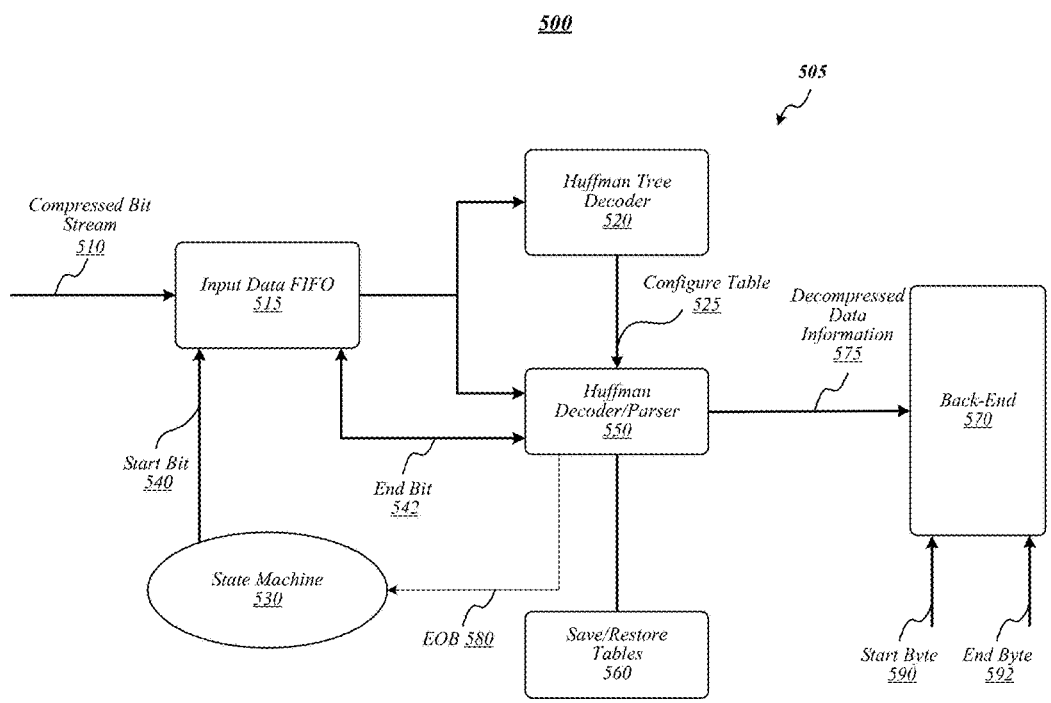
FIG. 5 illustrates an embodiment of a third operating environment.

FIG. 5 illustrates an example of an operating environment 500 that may be representative of various embodiments. The operating environment 500 depicted in FIG. 5 may generally include a hardware architecture for implementing a discrete decompression process for decompressing discrete compressed data according to some embodiments.

As shown in FIG. 5, a decompression module 505 may include an input data first-in first-out FIFO 515 operative to receive a compressed bit stream 501. Input data first-in first-out FIFO 515 may also receive start bits 540 from a state machine 530 and may receive or exchange end bits 542 with a Huffman Decoder/Parser. Compressed bit stream 501 or portions thereof may be provided to a Huffman tree decoder 520 and/or a Huffman decoder/parser 550. Huffman tree decoder 520 may be operative to, among other things, provide configure tables 425 (for instance, Huffman trees) to Huffman decoders/parsers 550. Although Huffman-based elements are used as examples, such as in FIG. 5, embodiments are not so limited as other decoders and parsers capable of operating according to some embodiments are contemplated herein. State machine 530 may receive an end-of-block (EOB) token 580 from Huffman Decoder/Parser, for instance, indicating the end of a Deflate block of compressed bit stream 501. In some embodiments, decompression module 505 may support save/restore (for instance, with respect to Deflate headers). Accordingly, Huffman decoder/parser 550 may generate save/restore tables 560 to implement save/restore. In various embodiments, decompressed data information 575 (for instance, symbol type, literal byte, length-distance, and/or the like) may be provided to a back-end component 570 (for instance, an LZ77 copy back end with a (32 KB) history buffer memory). Back-end component 570 may receive a start byte 590 and an end byte 592 relating to decompressed data information.

In some embodiments, decompression module 505 may be implemented in hardware, software, or a combination thereof. In some embodiments, decompression module 505 may be at least partially implemented in hardware. In various embodiments, decompression module 505 may be configured to decompress multiple (for instance, two) portions (for instance, "chunks") of data, where the start and end bits are not byte aligned. For example, limited gather capabilities may be supported in a hardware-implemented (or at least partially hardware-implemented) decompression module 505, which may support decompression of two segments, where the segment boundaries are not byte-aligned.

In some embodiments, decompression module 505 (for example, hardware-implemented (or at least partially hardware-implemented)) may support save/restore (at least with respect to Deflate headers). A decompression module 505 supporting save/restore may only need to support decompression of one segment with bit boundaries (for instance, compared with gather capability support). In various embodiments, decompression module 505 may decode a Deflate header in one segment, store/save the decoded header data (for instance, in save/restore tables 560), then decode the second segment after reloading/restoring the saved header data. In some embodiments, a save/restore process may save and restore history buffers as well as corresponding Huffman trees/tables. In general, a history buffer may be larger than a Huffman tree. Accordingly, in some embodiments, decompression module 505 may save and restore the Huffman state without saving and restoring the history buffer.

In various embodiments, decompression module 505 may include and/or interact with an application (for instance, a low-level software driver) that performs a pair of memory copies to concatenate the two segments into a temporary buffer and then pass that to hardware (for instance, hardware-implemented (or at least partially hardware-implemented) decompression module 505). Bit-shifting may be required as the two segments may not be byte-aligned.

In a conventional LZ77-based or Deflate-based decompression process, a decompressor decodes data until the decompressor finds an EOB of the final block and/or the decompressor runs out of input (in which the decompressor expects to resume the decompression process with input data in a subsequent stream). However, the discrete decompression process may be configured according to some embodiments to only process (for instance, decompress) a portion of compressed data and to not simply continue until EOB 580 is received. More specifically, in some embodiments, the discrete decompression process may be configured to end decompression of discrete compressed data (for instance, compressed bit stream 510) at a specified location (for instance, a bit boundary) and to not merely continue unit EOB 580 is located. Accordingly, in various embodiments, decompression module 505 may parse the Deflate header without decoding the symbols that follow immediately after and, therefore, stop before the first symbol. When the Deflate Huffman configure tables are restored and the discrete block start location is provided with the real first symbol to be decoded, decompression module 505 may only decode for a specified distance (for instance, a discrete block including the operation target). In this manner, the decompression process according to some embodiments does not unnecessarily decode elements that are not needed to provide operation target, conserving I/O, memory bandwidth, processor resources, and/or the like. In some embodiments, decompression module 505 may be configured to suppress outputs until a specified point is reached (for instance, an "output location") to further conserver resources.

In some embodiments, if full compression of compressed bit stream 510 is required (for instance, a full-scan of a column of compressed column-oriented data), decompression module 505 may perform a conventional Deflate decompression process on compressed bit stream 510. If random access to compressed bit stream is required, decompression module 505 may perform a discrete decompression process according to some embodiments in which index lookups are performed for the operation target, the Deflate header is provided to the decompression engine (for instance, Huffman tree decoder and/or Huffman decoder/parser), then a start of the discrete block stream of compressed bit stream 510 is provided to the engine after restore of the Deflate Huffman code data.

Included herein are one or more logic flows representative of exemplary methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, hardware, or any combination thereof. In software and firmware embodiments, a logic flow may be implemented by computer executable instructions stored on a non-transitory computer readable medium or machine readable medium, such as an optical, magnetic or semiconductor storage. The embodiments are not limited in this context.

Figure 6:
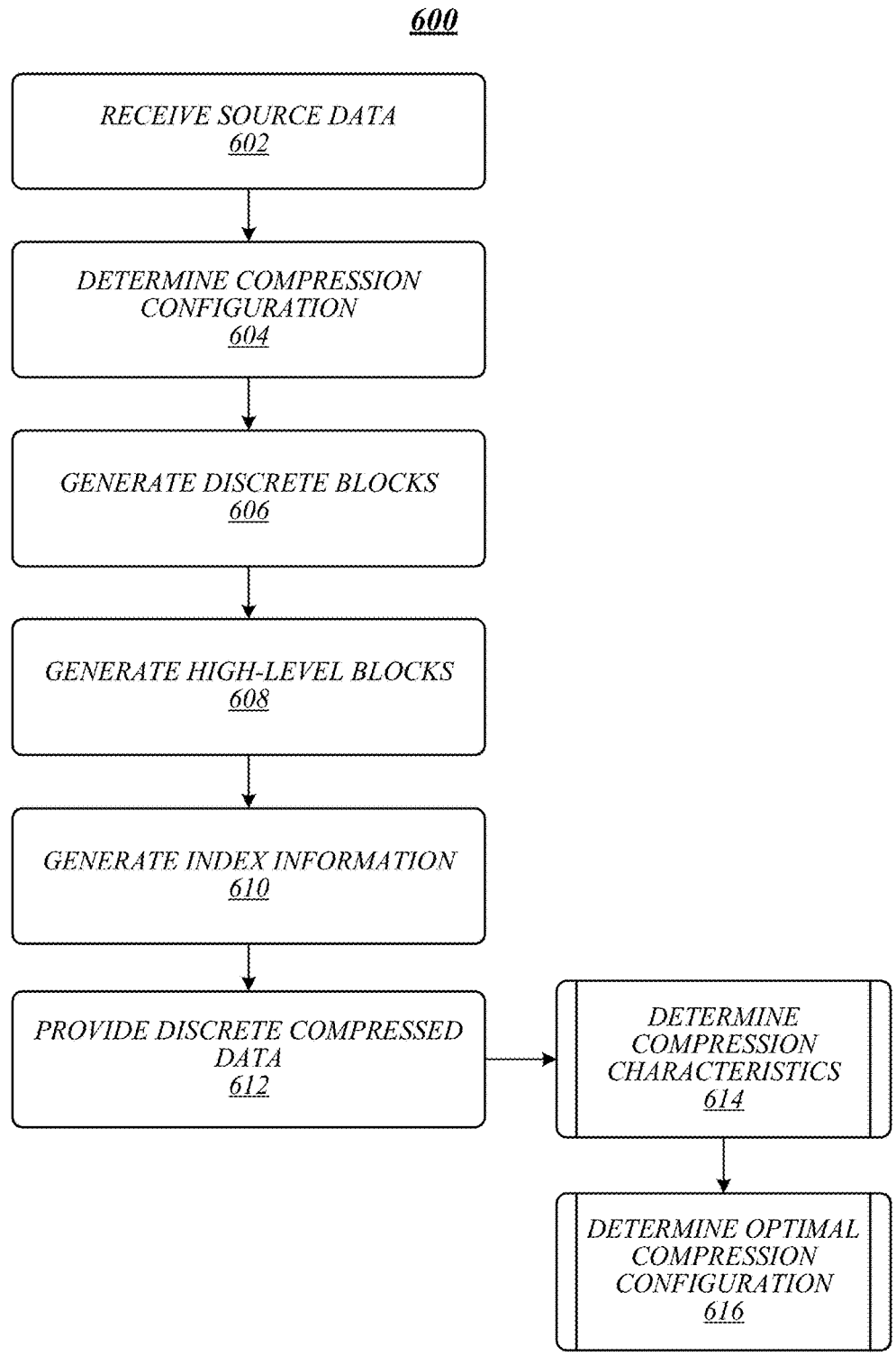
FIG. 6 illustrates an embodiment of a first logic flow.

FIG. 6 illustrates an embodiment of a logic flow 600 according to some embodiments. Logic flow 600 may be representative of some or all of the operations executed by one or more embodiments described herein, such as apparatuses 105 and 205. In some embodiments, logic flow 600 may be representative of some or all of the operations of a discrete compression process operative to generate discrete compressed data.

In the illustrated embodiment shown in FIG. 6, logic flow 600 at block 602 may receive source data. For instance, compression module 130 may receive source data 150 from database 160. In some embodiments, source data 150 may include data from a column-orientated database. At block 604, logic flow 600 may determine a compression configuration. In some embodiments, a compression configuration may be expressed as <size of discrete blocks (or size of uncompressed data of discrete blocks)>/<number of discrete blocks per Deflate block> or <size of discrete blocks>/<size of high-level blocks> (for instance, indicating a number of discrete blocks per high-level block). For example, compression module 130 may use a default compression configuration (for instance, 1/4, 1/16, 16/64, and/or the like) or may obtain an optimal compression configuration associated with the source data.

Logic flow 600 may generate discrete blocks at block 606. For instance, encoder 244 of compression module 230 may generate blocks 248*a-n* which may include discrete blocks. The discrete blocks may be configured according to the compression configuration. For example, each discrete block may be configured to include a certain amount of data and to include history information required to decode data within the discrete block. At block 608, logic flow 600 may generate high-level blocks. For example, discrete blocks generated at block 606 may be arranged within high-level blocks, such as Deflate blocks. Decompression module 230 may generate Deflate blocks to include headers and a number or discrete blocks according to the compression configuration. Logic flow 600 may generate index information at block 610. For example, compression module 230 may generate index information 246. In some embodiments, index information 405 may include nominal byte information 422 and an index array 420 including a byte offset 424 and a bit offset 426. In some embodiments, the byte offset 424 may represent the byte offset within the uncompressed data, and the bit offset 426 may represent the bit offset of the uncompressed data. At block 612, logic flow may provide discrete compressed data. For example, compression module 130 may transmit discrete compressed data 154 to one or more data consumers (for instance, an application requesting an operation target).

In some embodiments, logic flow 600 may perform optional functions at blocks 614 and 616. For example, logic flow 600 may determine compression characteristics at block 614. Compression characteristics may generally include characteristics of discrete compressed data generated via a discrete compression process according to some embodiments. A non-limiting example of a compression characteristics may include a compression ratio. At block 616, logic flow 600 may determine an optimal compression configuration. For example, for one or more data sources, logic flow 600 may determine which compression configuration leads to the best compression ratio (or other compression characteristic). For example, when a column is being loaded into memory, the data may be compressed using a 1/16 configuration and a 16/64 configuration. If the compressed size using a first configuration (for instance, 16/64) is better by a threshold (for instance, 25%) than a second configuration (for instance, 1/16), use the first configuration. Accordingly, in some embodiments, the compression configuration may be determined based on a compression characteristic, such as compression ratio. In this manner, logic flow 600 may use the optimal compression configuration when determine which compression configuration to use for source data at block 604. In some embodiments, the optimal compression configuration may be stored in a table or other data structure in a memory of an apparatus performing logic flow. In some embodiments, the optimal compression configuration may be stored as metadata with the data source (for instance, a database of compressed information, a compressed data file property, and/or the like).

In some embodiments, the order of blocks 606, 608, and/or 610 may be different than the order provided in FIG. 6. For example, logic flow 600 may perform all or a portion of the functions associated with blocks 606, 608, and/or 610 simultaneously (or substantially simultaneously) and/or in a different order. For instance, logic flow may perform blocks 606, 608, and/or 610 in the following orders: 606, 608, 610; 606, 610, 608; 608, 606, 610; 608, 610, 606; 610, 606, 608; 610, 608, 606; 606 and 608 simultaneously, 610; 606 and 610 simultaneously, 608; 608 and 610 simultaneously, 606; or 606, 608, 610 simultaneously. Embodiments are not limited in this context.

Figure 7:
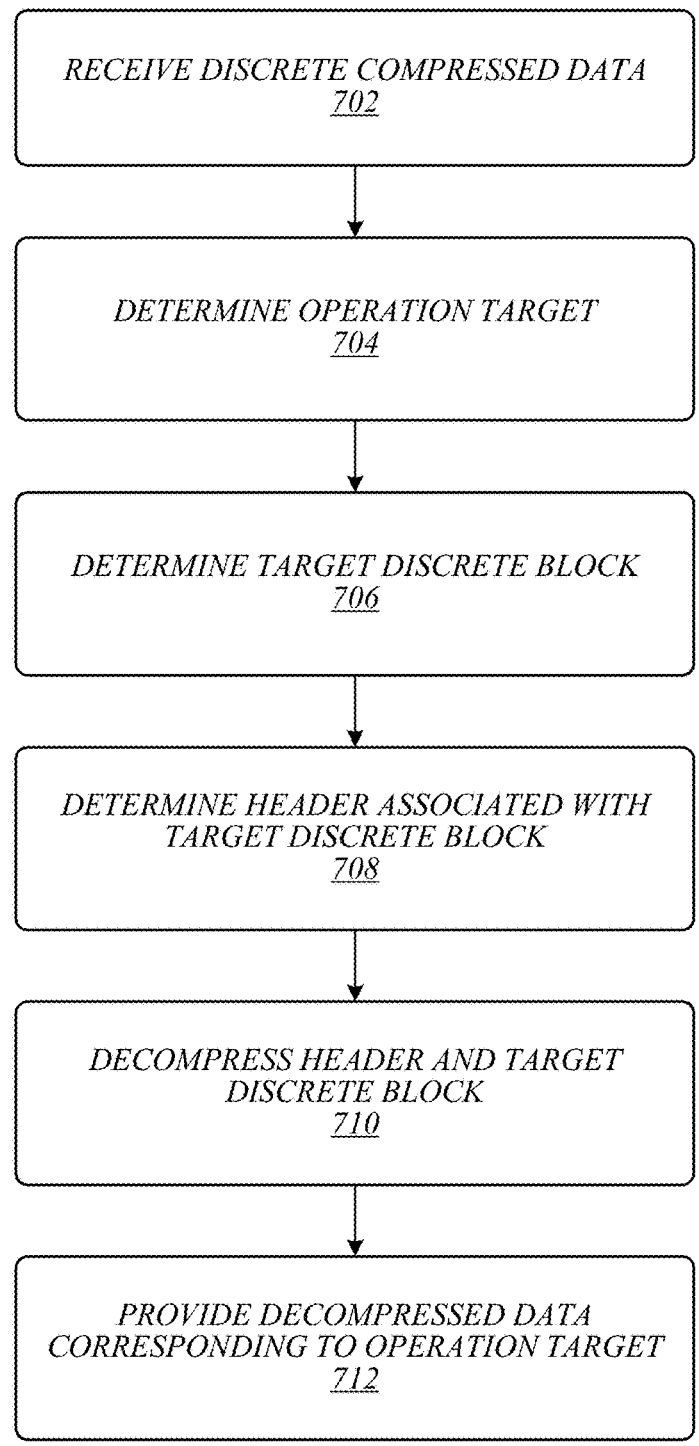
FIG. 7 illustrates an embodiment of a second logic flow.

FIG. 7 illustrates an embodiment of a logic flow 700 according to some embodiments. Logic flow 700 may be representative of some or all of the operations executed by one or more embodiments described herein, such as apparatus 105 and/or decompression module 505. In some embodiments, logic flow 600 may be representative of some or all of the operations of a decompression process operative to decompress discrete compressed data.

In the illustrated embodiment shown in FIG. 7, logic flow 700 at block 702 may receive discrete compressed data. For example, decompression module 140 may access discrete compressed data 154 generated via compression module 130. At block 704, logic flow 700 may determine an operation target. For example, an operation target may include a specific byte location (for instance, byte number 3100) of an operation, such as a decompression operation to decompress the operation target. Logic flow may determine a target discrete block at block 706. For example, decompression module 140 may determine the nominal discrete block corresponding to the operation target using the index information. Using index information 405 as an example, decompression module 140 may determine that the nominal discrete block entry is 4 (3100 is between 3072 and 4095 of nominal byte information 422). Decompression module 140 may use the actual byte offset for entry 4 to determine that the nominal discrete block actually begins at byte offset 3242, which is beyond the desired byte 3100. Accordingly, decompression module 140 may determine that byte 3100 is located in an earlier discrete block. For example, decompression module 140 may determine that the target discrete block is entry 3.

Logic flow 700 may determine the header corresponding with the target discrete block at block 708. For example, decompression module 140 may use index information 405 to determine that the Deflate header for the target discrete block of entry 3 is at entry 0. At block 710, logic flow 700 may decompress the header and the target discrete block. For example, decompression module 140 may decompress the header corresponding to the target discrete block determined at block 708 and may decompress the target discrete block. Maintaining the example of the index information 405 of FIG. 4, the following two portions of the compressed source data may be decompressed: the header (bit offset 80 to 577) and the discrete block of entry 3 (bit offset 5831 to 8056). At block 712, logic flow 700 may provide decompressed data corresponding to the operation target. For example, decompression module may provide decompressed data 152 to a requesting entity, such as a software application, operating system (OS), thread, and/or the like.

EXAMPLES

Comparison of Compression Processes Example

Figure 8:
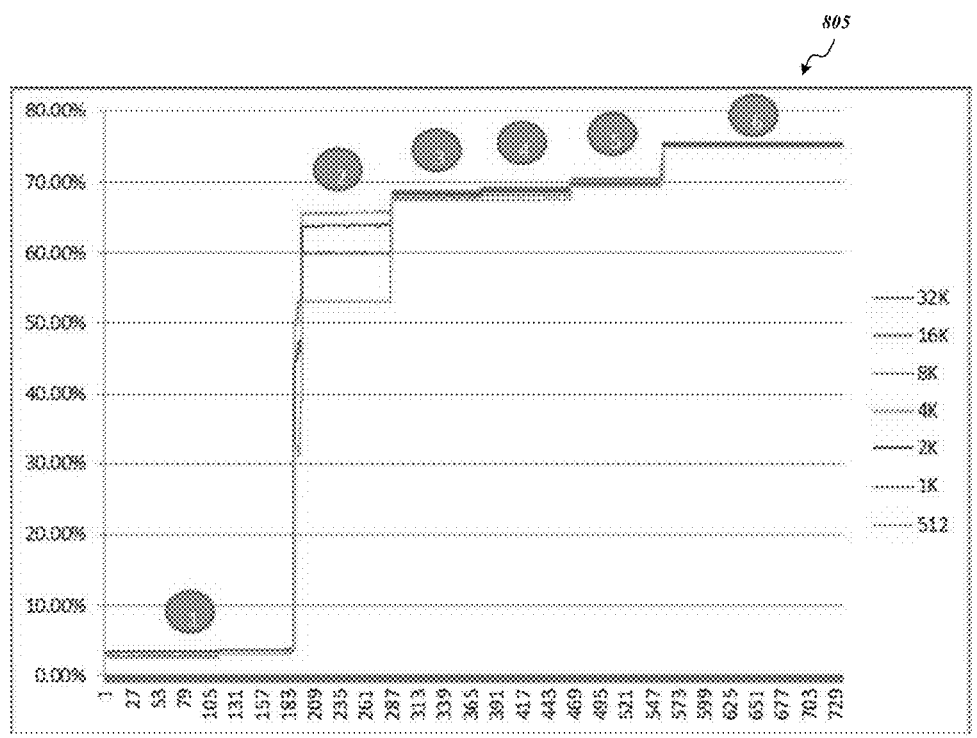
FIG. 8 illustrates a graph of results of conventional compression processes on a plurality of data types.

A plurality of individual samples of column-orientated data were compressed that were varied in nature and typical of real-world data. The samples were compressed using a conventional compression with a 4 KB history (instead of a typical 32 KB history. The results of the conventional compression of the 736 samples are depicted in graph 805 of FIG. 8 with different sized history windows and sorted by ratio. In general, the samples vary from very compressible to relatively incompressible, and certain samples tend to behave similar to other samples. The samples depicted in graph 805 were divided into types 1-6, where type 1 consisted of the most-compressible files and type-6 consisted of the least compressible files.

The samples were then compressed using the compression processes provided in the following Table 1:

TABLE 1

| | |
|---|---|
| ozip | Oracle ® proprietary compression (zip) process |
| Zlib-9 | zlib compression at highest setting (level 9) |
| Deflate | Conventional Deflate compression process with 4 KB history |
| 1/16 | Discrete compression process according to some embodiments using a 1/16 compression configuration (1 KB discrete block size, 16 KB high-level block size = 16 discrete blocks per high-level block) |
| 16/64 | Discrete compression process according to some embodiments using a 16/64 compression configuration (16 KB discrete block size, 64 KB high-level block size = 4 discrete blocks per high-level block) |

The compression ratio results of compressing the samples using the compression processes of Table 1 are provided in the following Table 2:

| Data Type | ozip | zlib -9 (32 KB history) | Zlib -9 | Deflate | 1/16 | 16/64 |
|---|---|---|---|---|---|---|
| 1 | 23.37 | 3.63 | 3.63 | 2.76 | 9.83 | 3.19 |
| 2 | 85.31 | 51.69 | 51.39 | 30.21 | 30.61 | 30.21 |
| 3 | 95.20 | 65.65 | 65.62 | 49.59 | 50.19 | 49.80 |
| 4 | 86.83 | 68.93 | 68.57 | 66.99 | 67.50 | 67.00 |
| 5 | 88.48 | 70.49 | 70.17 | 70.51 | 69.58 | 70.07 |
| 6 | 92.70 | 75.21 | 75.44 | 74.80 | 75.35 | 75.98 |
| all | 73.28 | 53.39 | 53.31 | 50.38 | 52.41 | 50.75 |

Only discrete compresses processes 1/16 and 16/64 would provide random access to compressed data. Accordingly, discrete compression processes according to some embodiments may provide high compression ratios while also allowing for random access for data.

Figure 9:
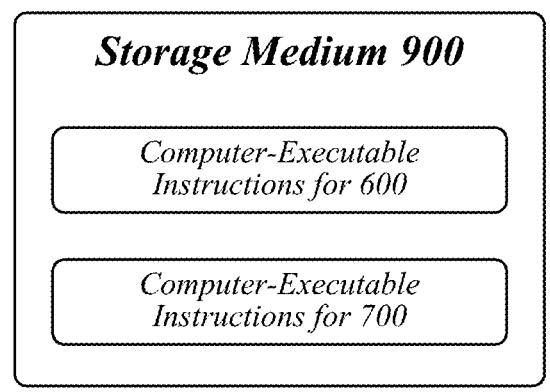
FIG. 9 illustrates an example of a storage medium.

FIG. 9 illustrates an example of a storage medium 900. Storage medium 900 may comprise an article of manufacture. In some examples, storage medium 900 may include any non-transitory computer readable medium or machine readable medium, such as an optical, magnetic or semiconductor storage. Storage medium 900 may store various types of computer executable instructions, such as instructions to implement logic flow 600 and/or logic flow 700. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 10:
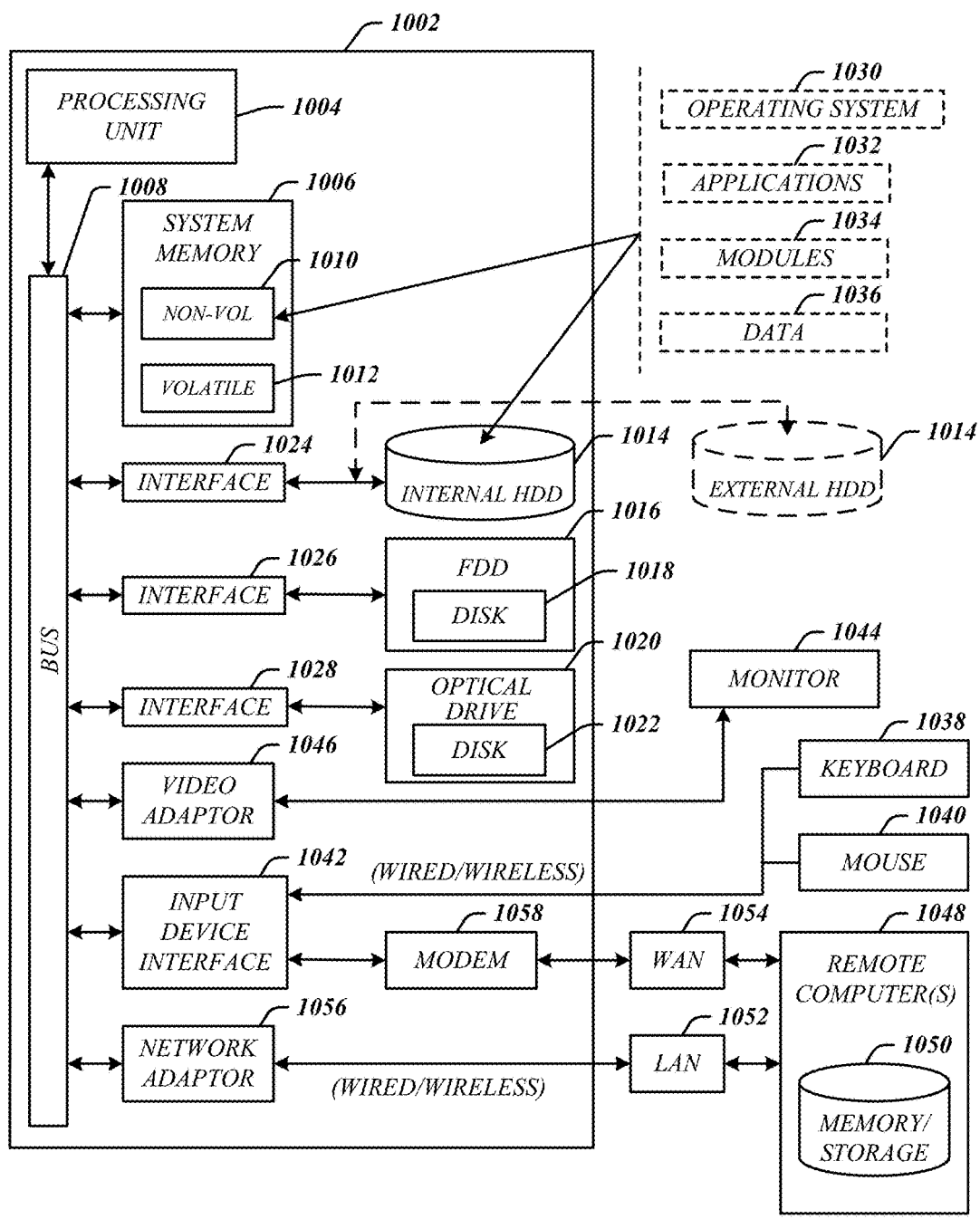
FIG. 10 illustrates an example computing platform.

FIG. 10 illustrates an example computing platform 1000. In some examples, as shown in FIG. 10, computing platform 1000 may include a processing component 1040, other platform components or a communications interface 1060. According to some examples, computing platform 1000 may be implemented in a computing device such as a server in a system such as a data center. Embodiments are not limited in this context.

According to some examples, processing component 1040 may execute processing operations or logic for one of apparatus 105 or 205 and/or decompression module 505. Processing component 1040 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 1050 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 1060 may include logic and/or features to support a communication interface. For these examples, communications interface 1060 may include one or more communication interfaces that operate according to various communication protocols or standards to communicate over direct or network communication links. Direct communications may occur via use of communication protocols or standards described in one or more industry standards (including progenies and variants) such as those associated with the PCI Express specification. Network communications may occur via use of communication protocols or standards such those described in one or more Ethernet standards promulgated by the Institute of Electrical and Electronics Engineers (IEEE). For example, one such Ethernet standard may include IEEE 802.3-2012, Carrier sense Multiple access with Collision Detection (CSMA/CD) Access Method and Physical Layer Specifications, Published in December 2012 (hereinafter "IEEE 802.3"). Network communication may also occur according to one or more OpenFlow specifications such as the OpenFlow Hardware Abstraction API Specification. Network communications may also occur according to Infiniband Architecture Specification, Volume 1, Release 1.3, published in March 2015 ("the Infiniband Architecture specification").

Computing platform 1000 may be part of a computing device that may be, for example, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of computing platform 1000 described herein, may be included or omitted in various embodiments of computing platform 1000, as suitably desired.

The components and features of computing platform 1000 may be implemented using any combination of discrete circuitry, ASICs, logic gates and/or single chip architectures. Further, the features of computing platform 1000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 1000 shown in the block diagram of FIG. 10 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments:

Example 1 is an apparatus, comprising at least one memory, and logic, at least a portion of the logic comprised in hardware coupled to the at least one memory, the logic to determine a compression configuration to compress source data, generate discrete compressed data comprising at least one high-level block, the high-level block comprising a header and at least one discrete block configured based on the compression configuration, and generate index information for accessing the at least one discrete block.

Example 2 is the apparatus of Example 1, the at least one high-level block comprising a Deflate block.

Example 3 is the apparatus of Example 1, the logic to compress the source data using a Deflate compression process.

Example 4 is the apparatus of Example 1, the compression configuration comprising a discrete block size.

Example 5 is the apparatus of Example 1, the compression configuration comprising a high-level block size.

Example 6 is the apparatus of Example 1, the compression configuration comprising a discrete block size and a high-level block size.

Example 7 is the apparatus of Example 1, the compression configuration comprising a discrete block size and a number of discrete blocks per high-level block.

Example 8 is the apparatus of Example 1, the logic to determine the compression configuration based on a compression characteristic.

Example 9 is the apparatus of Example 1, the logic to determine the compression configuration based on a compression characteristic, the compression characteristic comprising a compression ratio.

Example 10 is the apparatus of Example 1, the logic to access an optimal compression configuration for the source data, and set the compression configuration to the optimal compression configuration.

Example 11 is the apparatus of Example 1, the compression configuration comprising a discrete block size and a high-level block size, the discrete block size comprising a value of 1 kilobyte and the high-level block size comprising a value of 16 kilobytes.

Example 12 is the apparatus of Example 1, the compression configuration comprising a discrete block size and a high-level block size, the discrete block size comprising a value of 16 kilobytes and the high-level block size comprising a value of 64 kilobytes.

Example 13 is the apparatus of Example 1, the at least one discrete block comprising a plurality of discrete blocks each having a variable sized boundary.

Example 14 is the apparatus of Example 1, the index information comprising a byte offset of uncompressed data and a bit offset of the discrete compressed data.

Example 15 is the apparatus of Example 1, the at least one discrete block comprising a plurality of discrete blocks each having a variable sized boundary, the index information comprising a byte offset of uncompressed data and a bit offset of the discrete compressed data Example 16 is the apparatus of Example 1, the at least one discrete block comprising a plurality of discrete blocks each having a same sized boundary.

Example 17 is the apparatus of Example 1, the at least one discrete block comprising a plurality of discrete blocks each having a same sized boundary, the index information comprising a bit offset of the discrete compressed data.

Example 18 is the apparatus of Example 1, the at least one discrete block comprising history information for decompressing all of the data of the at least one discrete block.

Example 19 is the apparatus of Example 1, the at least one discrete block comprising history information for decompressing all of the data of the at least one discrete block, the history information not including information for other discrete blocks.

Example 20 is the apparatus of Example 1, the source data comprising column-orientated data.

Example 21 is the apparatus of Example 1, the logic to provide random access to the discrete compressed data for an operation target by determining a header and a target discrete block associated with the operation target, and decompressing the header and the target discrete block to generate decompressed data for the operation target.

Example 22 is a system, comprising the apparatus according to any of Examples 1-21, and at least one network interface.

Example 23 is a method, comprising determining a compression configuration to compress source data, generating discrete compressed data comprising at least one high-level block, the high-level block comprising a header and at least one discrete block configured based on the compression configuration, and generating index information for accessing the at least one discrete block.

Example 24 is the method of Example 23, the at least one high-level block comprising a Deflate block.

Example 25 is the method of Example 23, comprising compressing the source data using a Deflate compression process.

Example 26 is the method of Example 23, the compression configuration comprising a discrete block size.

Example 27 is the method of Example 23, the compression configuration comprising a high-level block size.

Example 28 is the method of Example 23, the compression configuration comprising a discrete block size and a high-level block size.

Example 29 is the method of Example 23, the compression configuration comprising a discrete block size and a number of discrete blocks per high-level block.

Example 30 is the method of Example 23, comprising determining the compression configuration based on a compression characteristic.

Example 31 is the method of Example 23, comprising determining the compression configuration based on a compression characteristic, the compression characteristic comprising a compression ratio.

Example 32 is the method of Example 23, comprising accessing an optimal compression configuration for the source data, and setting the compression configuration to the optimal compression configuration.

Example 33 is the method of Example 23, the compression configuration comprising a discrete block size and a high-level block size, the discrete block size comprising a value of 1 kilobyte and the high-level block size comprising a value of 16 kilobytes.

Example 34 is the method of Example 23, the compression configuration comprising a discrete block size and a high-level block size, the discrete block size comprising a value of 16 kilobytes and the high-level block size comprising a value of 64 kilobytes.

Example 35 is the method of Example 23, the at least one discrete block comprising a plurality of discrete blocks each having a variable sized boundary.

Example 36 is the method of Example 23, the index information comprising a byte offset of uncompressed data and a bit offset of the discrete compressed data.

Example 37 is the method of Example 23, the at least one discrete block comprising a plurality of discrete blocks each having a variable sized boundary, the index information comprising a byte offset of uncompressed data and a bit offset of the discrete compressed data Example 38 is the method of Example 23, the at least one discrete block comprising a plurality of discrete blocks each having a same sized boundary.

Example 39 is the method of Example 23, the at least one discrete block comprising a plurality of discrete blocks each having a same sized boundary, the index information comprising a bit offset of the discrete compressed data.

Example 40 is the method of Example 23, the at least one discrete block comprising history information for decompressing all of the data of the at least one discrete block.

Example 41 is the method of Example 23, the at least one discrete block comprising history information for decompressing all of the data of the at least one discrete block, the history information not including information for other discrete blocks.

Example 42 is the method of Example 23, the source data comprising column-orientated data.

Example 43 is the method of Example 23, comprising providing random access to the discrete compressed data for an operation target by determining a header and a target discrete block associated with the operation target, and decompressing the header and the target discrete block to generate decompressed data for the operation target.

Example 44 is a computer-readable storage medium, comprising a plurality of instructions that, when executed, enable processing circuitry to determine a compression configuration to compress source data, generate discrete compressed data comprising at least one high-level block, the high-level block comprising a header and at least one discrete block configured based on the compression configuration, and generate index information for accessing the at least one discrete block.

Example 45 is the computer-readable storage medium of Example 44, the at least one high-level block comprising a Deflate block.

Example 46 is the computer-readable storage medium of Example 44, the instructions, when executed, to enable the processing circuitry to compress the source data using a Deflate compression process.

Example 47 is the computer-readable storage medium of Example 44, the compression configuration comprising a discrete block size.

Example 48 is the computer-readable storage medium of Example 44, the compression configuration comprising a high-level block size.

Example 49 is the computer-readable storage medium of Example 44, the compression configuration comprising a discrete block size and a high-level block size.

Example 50 is the computer-readable storage medium of Example 44, the compression configuration comprising a discrete block size and a number of discrete blocks per high-level block.

Example 51 is the computer-readable storage medium of Example 44, the instructions, when executed, to enable the processing circuitry to determine the compression configuration based on a compression characteristic.

Example 52 is the computer-readable storage medium of Example 44, the instructions, when executed, to enable the processing circuitry to determine the compression configuration based on a compression characteristic, the compression characteristic comprising a compression ratio.

Example 53 is the computer-readable storage medium of Example 44, the instructions, when executed, to enable the processing circuitry to access an optimal compression configuration for the source data, and set the compression configuration to the optimal compression configuration.

Example 54 is the computer-readable storage medium of Example 44, the compression configuration comprising a discrete block size and a high-level block size, the discrete block size comprising a value of 1 kilobyte and the high-level block size comprising a value of 16 kilobytes.

Example 55 is the computer-readable storage medium of Example 44, the compression configuration comprising a discrete block size and a high-level block size, the discrete block size comprising a value of 16 kilobytes and the high-level block size comprising a value of 64 kilobytes.

Example 56 is the computer-readable storage medium of Example 44, the at least one discrete block comprising a plurality of discrete blocks each having a variable sized boundary.

Example 57 is the computer-readable storage medium of Example 44, the index information comprising a byte offset of uncompressed data and a bit offset of the discrete compressed data.

Example 58 is the computer-readable storage medium of Example 44, the at least one discrete block comprising a plurality of discrete blocks each having a variable sized boundary, the index information comprising a byte offset of uncompressed data and a bit offset of the discrete compressed data Example 59 is the computer-readable storage medium of Example 44, the at least one discrete block comprising a plurality of discrete blocks each having a same sized boundary.

Example 60 is the computer-readable storage medium of Example 44, the at least one discrete block comprising a plurality of discrete blocks each having a same sized boundary, the index information comprising a bit offset of the discrete compressed data.

Example 61 is the computer-readable storage medium of Example 44, the at least one discrete block comprising history information for decompressing all of the data of the at least one discrete block.

Example 62 is the computer-readable storage medium of Example 44, the at least one discrete block comprising history information for decompressing all of the data of the at least one discrete block, the history information not including information for other discrete blocks.

Example 63 is the computer-readable storage medium of Example 44, the source data comprising column-orientated data.

Example 64 is the computer-readable storage medium of Example 44, the instructions, when executed, to enable the processing circuitry to provide random access to the discrete compressed data for an operation target by determining a header and a target discrete block associated with the operation target, and decompressing the header and the target discrete block to generate decompressed data for the operation target.

Example 65 is an apparatus, comprising a configuration means to determine a compression configuration to compress source data, a compression means generate discrete compressed data comprising at least one high-level block, the high-level block comprising a header and at least one discrete block configured based on the compression configuration, and an index means to generate index information for accessing the at least one discrete block.

Example 66 is the apparatus of Example 65, the at least one high-level block comprising a Deflate block.

Example 67 is the apparatus of Example 65, the compression means to compress the source data using a Deflate compression process.

Example 68 is the apparatus of Example 65, the compression configuration comprising a discrete block size.

Example 69 is the apparatus of Example 65, the compression configuration comprising a high-level block size.

Example 70 is the apparatus of Example 65, the compression configuration comprising a discrete block size and a high-level block size.

Example 71 is the apparatus of Example 65, the compression configuration comprising a discrete block size and a number of discrete blocks per high-level block.

Example 72 is the apparatus of Example 65, the configuration means to determine the compression configuration based on a compression characteristic.

Example 73 is the apparatus of Example 65, the configuration means to determine the compression configuration based on a compression characteristic, the compression characteristic comprising a compression ratio.

Example 74 is the apparatus of Example 65, the configuration means to access an optimal compression configuration for the source data, and set the compression configuration to the optimal compression configuration.

Example 75 is the apparatus of Example 65, the compression configuration comprising a discrete block size and a high-level block size, the discrete block size comprising a value of 1 kilobyte and the high-level block size comprising a value of 16 kilobytes.

Example 76 is the apparatus of Example 65, the compression configuration comprising a discrete block size and a high-level block size, the discrete block size comprising a value of 16 kilobytes and the high-level block size comprising a value of 64 kilobytes.

Example 77 is the apparatus of Example 65, the at least one discrete block comprising a plurality of discrete blocks each having a variable sized boundary.

Example 78 is the apparatus of Example 65, the index information comprising a byte offset of uncompressed data and a bit offset of the discrete compressed data.

Example 79 is the apparatus of Example 65, the at least one discrete block comprising a plurality of discrete blocks each having a variable sized boundary, the index information comprising a byte offset of uncompressed data and a bit offset of the discrete compressed data Example 80 is the apparatus of Example 65, the at least one discrete block comprising a plurality of discrete blocks each having a same sized boundary.

Example 81 is the apparatus of Example 65, the at least one discrete block comprising a plurality of discrete blocks each having a same sized boundary, the index information comprising a bit offset of the discrete compressed data.

Example 82 is the apparatus of Example 65, the at least one discrete block comprising history information for decompressing all of the data of the at least one discrete block.

Example 83 is the apparatus of Example 65, the at least one discrete block comprising history information for decompressing all of the data of the at least one discrete block, the history information not including information for other discrete blocks.

Example 84 is the apparatus of Example 65, the source data comprising column-orientated data.

Example 85 is the apparatus of Example 65, a decompression means to provide random access to the discrete compressed data for an operation target by determining a header and a target discrete block associated with the operation target, and decompressing the header and the target discrete block to generate decompressed data for the operation target.

Example 86 is a system, comprising the apparatus according to any of claims 65-85, and at least one network interface.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
   at least one memory; and
   logic, at least a portion of the logic comprised in hardware coupled to the at least one memory, the logic to:
      determine a compression configuration to compress source data,
      generate discrete compressed data comprising at least one high-level block, the high-level block comprising a header and at least one discrete block configured based on the compression configuration,
      generate index information for accessing the at least one discrete block, the index information comprising a byte offset of uncompressed data and a bit offset of the discrete compressed data,
      determine, based on the index information, a target header and a portion of a discrete block associated with an operation target, and
      decompress the target header and the portion of the discrete block to generate decompressed data for the operation target.

2. The apparatus of claim 1, the at least one high-level block comprising a Deflate block.

3. The apparatus of claim 1, the compression configuration comprising a discrete block size and a high-level block size.

4. The apparatus of claim 1, the logic to determine the compression configuration based on a compression characteristic, the compression characteristic comprising a compression ratio.

5. The apparatus of claim 1, the at least one discrete block comprising a plurality of discrete blocks each having a same sized boundary.

6. The apparatus of claim 1, the at least one discrete block comprising history information for decompressing all of the data of the at least one discrete block.

7. The apparatus of claim 1, the at least one discrete block comprising history information for decompressing all of the data of the at least one discrete block, the history information not including information for other discrete blocks.

8. The apparatus of claim 1, the source data comprising column-orientated data.

9. The apparatus of claim 1, the at least one discrete block comprising a plurality of discrete blocks each having a variable sized boundary.

10. A method, comprising:
    determining a compression configuration to compress source data,
    generating discrete compressed data comprising at least one high-level block, the high-level block comprising a header and at least one discrete block configured based on the compression configuration,
    generating index information for accessing the at least one discrete block, the index information comprising a byte offset of uncompressed data and a bit offset of the discrete compressed data,
    determining, based on the index information, a target header and a portion of a discrete block associated with an operation target, and
    decompressing the target header and the portion of the discrete block to generate decompressed data for the operation target.

11. The method of claim 10, the compression configuration comprising a discrete block size and a high-level block size.

12. The method of claim 10, comprising determining the compression configuration based on a compression characteristic, the compression characteristic comprising a compression ratio.

13. The method of claim 10, the at least one discrete block comprising a plurality of discrete blocks each having a same sized boundary.

14. The method of claim 10, the at least one discrete block comprising history information for decompressing all of the data of the at least one discrete block.

15. The method of claim 10, the at least one discrete block comprising history information for decompressing all of the data of the at least one discrete block, the history information not including information for other discrete blocks.

16. The method of claim 10, the source data comprising column-orientated data.

17. The method of claim 10, the at least one discrete block comprising a plurality of discrete blocks each having a variable sized boundary.

18. A computer-readable storage medium, comprising a plurality of instructions that, when executed, enable processing circuitry to:
- determine a compression configuration to compress source data;
- generate discrete compressed data comprising at least one high-level block, the high-level block comprising a header and at least one discrete block configured based on the compression configuration;
- generate index information for accessing the at least one discrete block, the index information comprising a byte offset of uncompressed data and a bit offset of the discrete compressed data;
- determine, based on the index information, a target header and a portion of a discrete block associated with an operation target; and
- decompress the target header and the portion of the discrete block to generate decompressed data for the operation target.

19. The computer-readable storage medium of claim 18, the at least one high-level block comprising a Deflate block.

20. The computer-readable storage medium of claim 18, the compression configuration comprising a discrete block size and a high-level block size.

21. The computer-readable storage medium of claim 18, the instructions, when executed, to enable the processing circuitry to determine the compression configuration based on a compression characteristic, the compression characteristic comprising a compression ratio.

22. The computer-readable storage medium of claim 18, the at least one discrete block comprising history information for decompressing all of the data of the at least one discrete block, the history information not including information for other discrete blocks.

23. The computer-readable storage medium of claim 18, the source data comprising column-orientated data.

24. The computer-readable storage medium of claim 18, the at least one discrete block comprising a plurality of discrete blocks each having a same sized boundary.

25. The computer-readable storage medium of claim 18, the at least one discrete block comprising a plurality of discrete blocks each having a variable sized boundary.

* * * * *